US006603972B1

(12) United States Patent
Sawyer

(10) Patent No.: US 6,603,972 B1
(45) Date of Patent: *Aug. 5, 2003

(54) APPARATUS, METHOD AND SYSTEM FOR VOICE COMMUNICATION HAND-OFF IN A MOBILE PACKET DATA NETWORK ENVIRONMENT

(75) Inventor: Albert Joseph Sawyer, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,017

(22) Filed: Aug. 26, 1999

(51) Int. Cl.[7] ................................................ H04Q 7/20
(52) U.S. Cl. ....................................... 455/442; 455/436
(58) Field of Search ................................. 455/442, 436, 455/449, 432, 434, 435; 370/331–338, 401

(56) References Cited

U.S. PATENT DOCUMENTS

| 5,267,261 | A | * | 11/1993 | Blakeney, II et al. | ....... 370/332 |
| 5,278,892 | A | * | 1/1994 | Bolliger et al. | ............. 455/442 |
| 5,530,693 | A | * | 6/1996 | Averbuch et al. | ........... 370/331 |
| 5,590,133 | A | * | 12/1996 | Billstrom et al. | ........... 370/349 |
| 5,850,607 | A | * | 12/1998 | Muszynski | .................. 455/442 |
| 6,104,929 | A | * | 8/2000 | Josse et al. | .................. 455/445 |
| 6,256,300 | B1 | * | 7/2001 | Ahmed et al. | ............... 370/331 |

FOREIGN PATENT DOCUMENTS

EP  0823827 A2 * 2/1998 ............ H04Q/7/24

OTHER PUBLICATIONS

A. Valko et al., "Cellular IP" Internet Draft Nov. 18, 1998.*
Naghshineh et al., "End–to–End QOS provisioning in Multimedia Wireless/Mobile Networks Using an Adaptive Framework", IEEE communications vol. 35, No. 11, Nov. 1, 1997.*
Brasche et al., "Analysis of Multi–Slot MAC Protocols Proposed for the GSM Phase 2+ General Packet Radio Service", IEEE Vehicular Technology, vol. conf. 47, May 4, 1997.*

* cited by examiner

Primary Examiner—Nay Maung

(57) ABSTRACT

An apparatus, method and system are provided for a hand-off of a communication session in a wireless data network system, in which the communication session has been established previously with a mobile unit through a first base station, a first serving routing node and a gateway routing node utilizing a first addressing context. The preferred method embodiment includes, when a second base station has been selected for hand-off, first establishing a second addressing context, for the mobile unit, between the gateway routing node and a second serving routing node. The gateway routing node then concurrently routes incoming data packets for the mobile unit to the first serving routing node utilizing the first addressing context and to the second serving routing node utilizing the second addressing context. When the mobile unit has retuned to the second base station, the second base station transmits to the mobile unit current voice communication from the incoming data packets with the second addressing context, and receives any outgoing voice communication from the mobile unit. Following such retuning, the gateway routing node may then cease to route incoming data packets for the mobile unit to the first serving routing node utilizing the first addressing context while continuing to route incoming data packets for the mobile unit to the second serving routing node utilizing the second addressing context.

38 Claims, 5 Drawing Sheets

APPARATUS, METHOD AND SYSTEM FOR VOICE COMMUNICATION HAND-OFF IN A MOBILE PACKET DATA NETWORK ENVIRONMENT

CROSS-REFERENCE TO A RELATED APPLICATION

The present application is related to Lee, U.S. patent application Ser. No. 09/337,296, entitled "Seamless Data Network Telecommunication Service During Mobile Wireless Call Handoff", filed on Jun. 21, 1999 and commonly assigned to Lucent Technologies, Inc., incorporated by reference herein, with priority claimed for all commonly disclosed subject matter (the "related application").

BACKGROUND OF THE INVENTION

1. Field of the Invention

The present invention relates, in general, to wireless communication systems, and more particularly, to an apparatus, method and system for voice communication hand-off in a packet data network environment.

2. Background of the Invention

With the advent of increasingly sophisticated telecommunication networks and data networks (or equivalently, packet data networks), different types of services are increasingly available across different types of networks. For example, data transmission services are often utilized across circuit switched telecommunication networks. In addition, voice communication services are becoming increasingly available across packet data networks (or packet switched data networks), such as the internet.

For voice communication services over a packet switched data network, such as internet telephony, particular problems may arise in mobile environments. Mobile, wireless communication systems typically employ many base stations (transceivers) forming cells or cell sites, either with mobile switching centers for circuit switched communication or with routing nodes for full duplex data packet communication, to provide wireless communication throughout a given geographic region. As a mobile unit may traverse the geographic region, the communication to and from the mobile unit may occur through one or more of these base stations and routing nodes. To maintain an ongoing communication session during such transitions between base stations and switches, various hand-off methods have evolved in circuit switched networks to transfer the wireless communication to the mobile unit from one base station to another base station, while maintaining such an ongoing call or session.

In packet switched data networks, however, such hand-off methodologies are subject to competing and often diverging objectives. For example, for transmission of encoded data such as a text file or a data file, reliability of data transfer is typically more important than comparatively small transmission delays. As a consequence, during a hand-off, data transmission may be temporarily interrupted and the data buffered, followed by resumption of transmission upon completion of the hand-off and possible retransmission of any lost data. In voice communication over packet switched data networks, however, reliability is generally less important than and secondary to considerations pertinent to transmission delays, as even a very slight delay in transmission may be noticeable and result in consumer irritation and dissatisfaction, while comparatively small data losses may be unnoticeable and highly tolerable. Minimizing such transmission delays during mobile hand-offs are increasingly important for such voice communications over such data networks.

As a consequence, a need remains to provide for comparatively seamless voice communication hand-offs in mobile data networks, which do not interrupt ongoing voice communication sessions and which are relatively imperceptible to the consumer. In addition, such a wireless communication system should be reasonably efficient and capable of cost-effective implementation, eliminating or minimizing the use of additional network resources.

SUMMARY OF THE INVENTION

The wireless communication system of the present invention provides virtually seamless and imperceptible hand-offs of voice communication sessions of mobile units in a packet data network environment. The various embodiments of the present invention are reasonably efficient and capable of cost-effective implementation in existing communication equipment such as routing nodes and base stations. Moreover, the various embodiments of the present invention eliminate or minimize the use of additional network resources, while being compatible with other intelligent network devices and systems.

In accordance with the present invention, an apparatus, method and system are provided for a hand-off of a communication session in a data network. The system embodiment includes a gateway routing node, such as a global GSN, a plurality of serving routing nodes, such as serving GSNs, and a plurality of base stations (transceivers). Prior to such a hand-off, the communication session has been established previously with a mobile unit through a first base station, a first serving routing node and a gateway routing node, utilizing a first addressing context, which consists of embedded addressing layers designating the mobile unit, the first base station and the first serving routing node, for routing incoming data packets to the first base station for transmission to the mobile unit.

For the hand-off of the communication session, the gateway routing node includes instructions, when the second base station has been selected for the hand-off, to establish a second addressing context, for the mobile unit, between the gateway routing node and the second serving routing node, consisting of embedded addressing layers designating the mobile unit, the second base station and the second serving routing node, for routing of incoming data packets to the second base station. The gateway routing node then concurrently routes incoming data packets for the mobile unit to the first serving routing node utilizing the first addressing context and to the second serving routing node utilizing the second addressing context. When the mobile unit retunes to the second base station, the hand-off is complete, and the second base station includes instructions to transmit to the mobile unit current voice communication from the incoming data packets with a second addressing context and to receive outgoing voice communication from the mobile unit. Subsequent to retuning of the mobile unit to the second base station, the gateway routing node may cease to route incoming data packets for the mobile unit to the first serving routing node utilizing the first addressing context, while continuing to route incoming data packets for the mobile unit to the second serving routing node utilizing the second addressing context.

As a consequence, the communication session of the mobile unit has been handed off, seamlessly and without interruption, from the serving base station to the target base station. Such a hand-off has also occurred utilizing minimal network resources, the switch and the base stations, without involvement of other intelligent or supervisory network elements.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
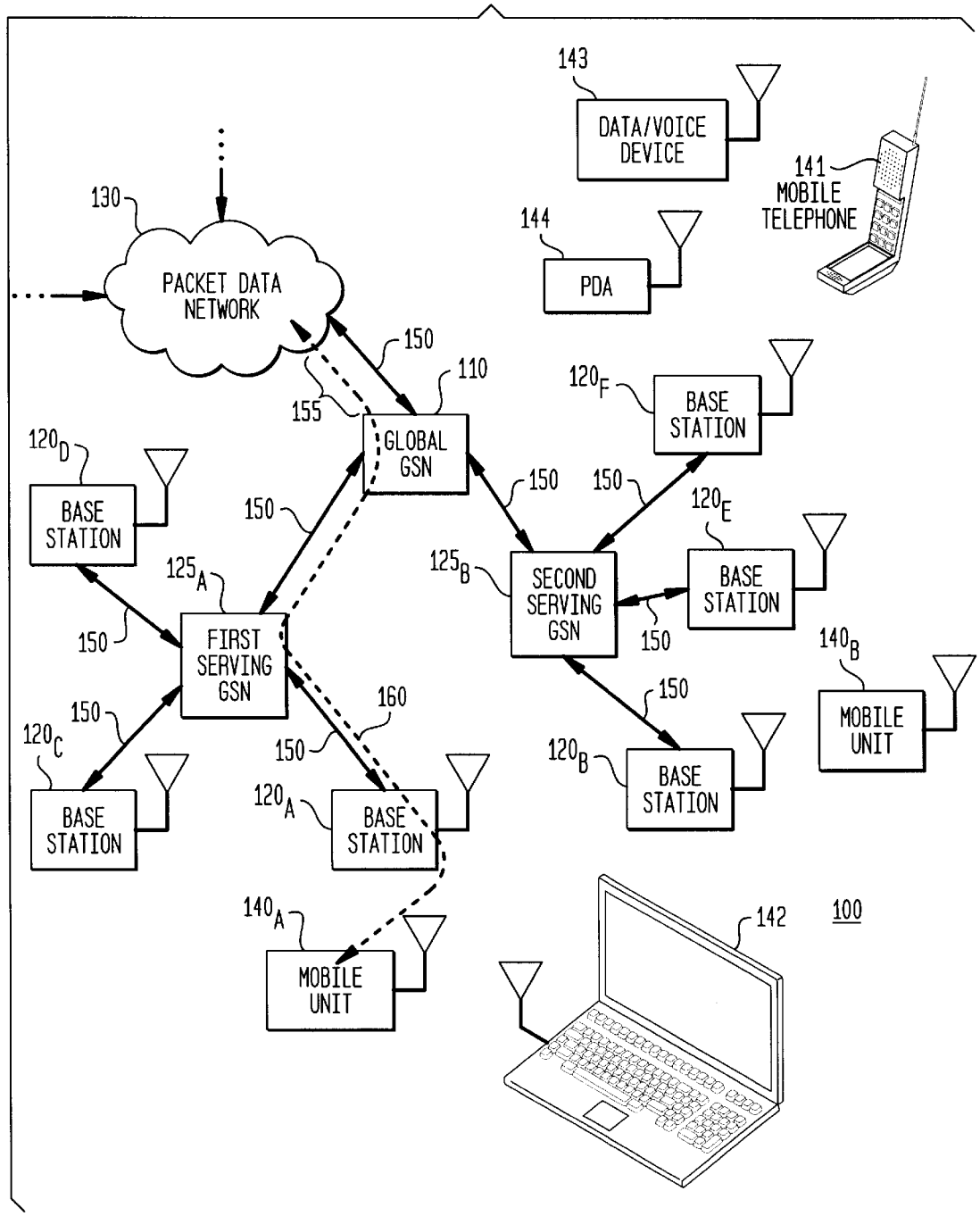
FIG. 1 is a block diagram illustrating a system embodiment prior to a hand-off, with a first communication path illustrated from a global GSN through a first serving GSN and a first base station to a mobile unit, in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a wireless communication system to provide comparatively seamless and imperceptible hand-offs of voice communication sessions over packet data networks, which is reasonably efficient and capable of cost-effective implementation. In accordance with the present invention, a system, apparatus and method are illustrated which provide such advantages, namely, providing relatively seamless and imperceptible wireless hand-offs while utilizing minimal network resources (namely, utilizing existing routing nodes and base stations configured in accordance with the invention).

FIG. 1 is a block diagram illustrating such a system embodiment 100 prior to a hand-off in accordance with the present invention. The system 100 may be utilized, for example, for a generalized packet radio service ("GPRS") in Europe or also in the United States. As illustrated in FIG. 1, the system 100 includes a gateway routing node, referred to as a global GPRS support node ("global GSN") 110, one or more serving GPRS support nodes ("serving GSNS") 125, such as a first serving GSN 125$_A$ and second serving GSN 125$_B$, and one or more base stations (or transceivers) 120, such as first base station 120$_A$ and second base station 120$_B$. The global GSN 110 and serving GSNs 125 are preferably packet data routing nodes manufactured by Lucent Technologies, Inc., utilized in GPRS systems which have been configured to operate in accordance with the present invention, as discussed in greater detail below. The global GSN 110 is coupled to a packet data network 130, for additional routing of voice or data communications. The global GSN 110 may also be coupled to other intelligent network devices (not illustrated). The base stations 120 include wireless transceivers, for wireless communication with any of a plurality of wireless devices referred to in general as mobile units 140, such as mobile telephones 141, a computer (with wireless modem, wireless terminal adapter or other wireless data transmission device) 142, another data/voice device 143 (such as a mobile telephone with paging functionality), and personal digital assistant ("PDA") 144. (For ease of reference, the term mobile unit is utilized herein to designate, in general, any such wireless device that may include one or more of any of these communication features, such as voice, paging or data transmission). The global GSN 110, serving GSNs 125, and base stations 120 are coupled to each other utilizing signaling and/or transmission lines 150, such as the types used for frame relay, as known in the art.

Continuing to refer to FIG. 1, a communication path 155 has been established to the mobile unit 140$_A$, for full duplex communication with another device (not illustrated) via first or serving base station 120$_A$, first serving GSN 125$_A$, global GSN 110, and through the packet data network 130 to the other device. As mentioned above, the communication path 155 is for packet data transmission. For voice communication, a speaker's utterances may be sampled and digitized (or packetized) at a variety of locations within the system 100, such as within the mobile unit 140 or within the serving base station 120$_A$. For incoming data packets from the packet data network 130 to be transmitted to the mobile unit 140$_A$, the global GSN 110 and first serving GSN 125$_A$ establish an addressing context or scheme (referred to in the art as a "tunnel"), providing embedded layers of addressing for proper routing of the incoming data packets from the global GSN 110 to the first serving GSN 125$_A$, to the first base station 120$_A$ and to the mobile unit 140$_A$, and conversely embedded layers of addressing for proper routing for outgoing data packets from the mobile unit 140$_A$, via the first base station, through the first serving GSN 125$_A$ and global GSN 110, and into the packet data network 130.

Also as mentioned above, for voice communication in accordance with the present invention, real-time data packet transmission without significant interruption has a higher priority than transmission accuracy or data reliability. For such voice communication in accordance with the present invention, any incoming data packets which may not have been delivered in real-time (or close to real-time) become irrelevant (as stale) and may be discarded. In contrast, for non-voice data transmission, such as for text files, accuracy has greater significance than real-time delivery, and as a consequence, stale data packets may be buffered and retransmitted, rather than discarded.

As any mobile unit 140 traverses a geographic region and becomes farther away from any given base station 120 with which it has been in communication, the signal or power levels of such wireless communication to and from the mobile unit 140 typically drop below a preferred threshold or range. Under these circumstances, it is preferable for the given base station 120 to hand-off the communication to another base station 120 having a higher signal strength to and from the given mobile unit 140. In accordance with the present invention, this determination may be made by the given mobile unit 140 or by the various base stations 120. Continuing to refer to FIG. 1, for example, the mobile unit $140_A$ (at a time t<$t_1$) is currently served by first base station $120_A$, illustrated as communication or call path 160 (with the portion of the communication session between the global GSN 110 and the packet data network 130 separately illustrated as call path 155). In these circumstances, the first base station $120_A$ is generally referred to as a serving base station or serving cell site. As the mobile unit $140_A$ travels toward the vicinity of the second base station $120_B$, it may become necessary or preferable for the first, serving base station $120_A$ to hand-off the communication of mobile unit $140_A$ to the second base station $120_B$. In these circumstances, the second base station $120_B$ is generally referred to as a target base station or target cell site. Such a hand-off, in accordance with the present invention, is illustrated below with respect to FIGS. 2 and 3.

Figure 2:
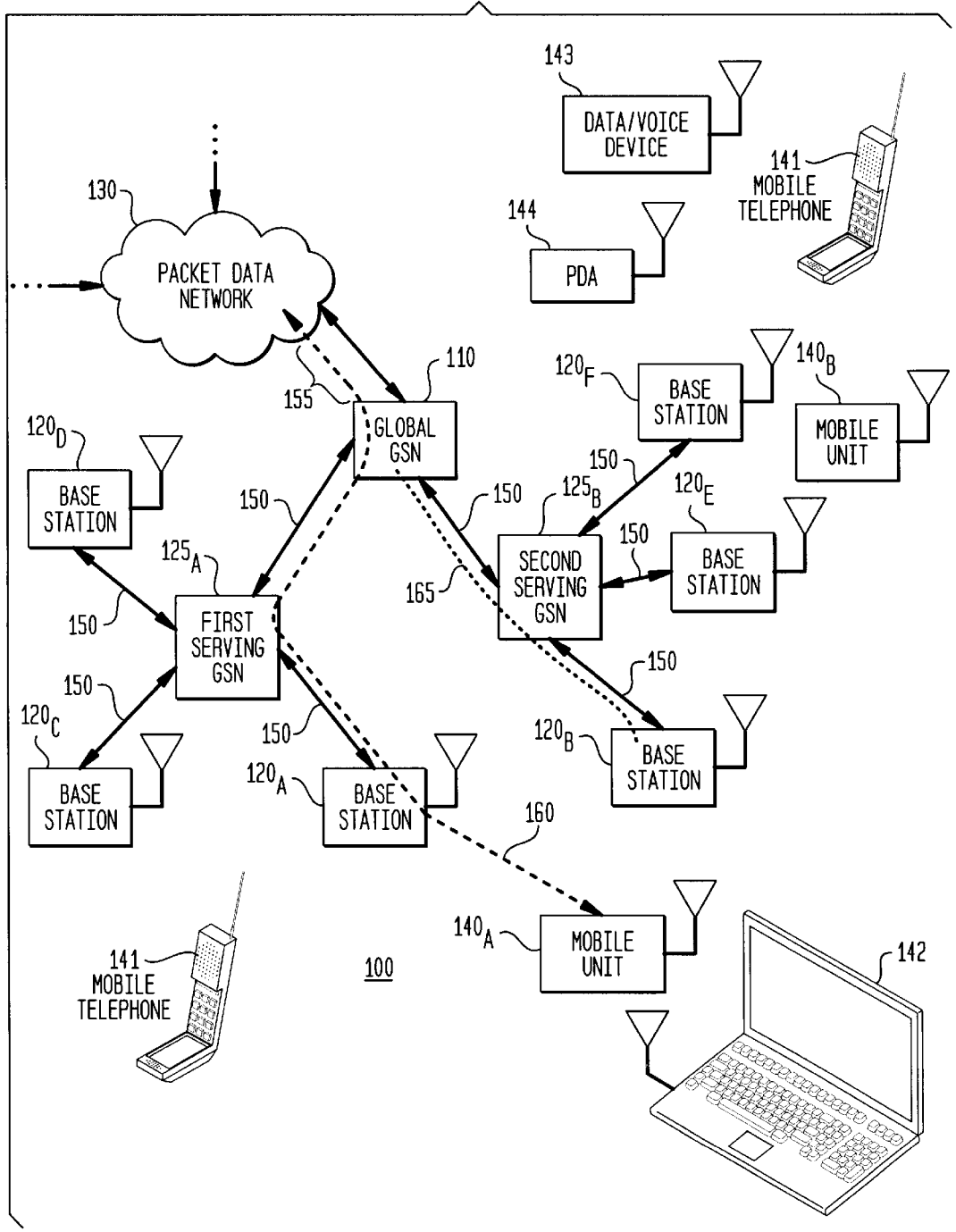
FIG. 2 is a block diagram illustrating a system embodiment during a hand-off, with the first communication path illustrated from the global GSN through the first serving GSN and first base station to the mobile unit, and a second communication path illustrated from the global GSN through a second serving GSN and second base station, in accordance with the present invention.

FIG. 2 is a block diagram illustrating the system embodiment 100 during a hand-off, with the first communication path 160 illustrated from the global GSN 110 through the first serving GSN $125_A$ and first base station $120_A$ to the mobile unit $140_A$, and a second communication path 165 illustrated from the global GSN 110 through a second serving GSN $125_B$ and second base station $120_B$, in accordance with the present invention. To accomplish a hand-off in accordance with the present invention, and as explained in greater detail below, the second communication path 165 is established by communication between or among the second, target base station $120_B$, the second serving GSN $125_B$, and the global GSN 110. More specifically, once second base station $120_B$ has been selected as the target base station for hand-off, the global GSN 110, the second serving GSN $125_B$ and second base station $120_B$ are informed of the impending hand-off and engage in various communication set-up activities, discussed in greater detail below.

Informing the global GSN 110, the second serving GSN $125_B$ and second base station $120_B$ of the impending voice communication hand-off may occur in a variety of ways. First, in the event that the mobile unit $140_A$ has selected the second base station $120_B$ as the target, the mobile unit $140_A$ may provide a corresponding message to the second base station $120_B$, which in turn provides corresponding messaging to the second serving GSN $125_B$, and in turn, to the global GSN 110. Alternatively, such messaging may occur through the first base station $120_A$, the first serving GSN $125_A$, and then to the global GSN 110, the second serving GSN $125_B$ and second base station $120_B$. As another alternative, while not separately illustrated in FIG. 2, the system 100 may include transmission links 150 between the serving GSNs 125 and, when so configured, messaging may occur directly between the first serving GSN $125_A$ and the second serving QSN $125_B$. If the communication session has not been previously designated as a voice session (such as during call set up), in the preferred embodiment, the hand-off messaging includes such a designation, to distinguish the hand-off as a voice communication hand-off (rather than other types of data transmission hand-offs, in which timeliness may be of secondary importance).

To establish the second communication path 165, the global GSN 110 and the second serving GSN $125_B$ establish a second addressing context (or second tunnel) for the mobile unit $140_A$. For incoming data packets from the packet data network 130 to be transmitted to the mobile unit $140_A$ after completion of the hand-off, the global GSN 110 and second serving GSN $125_B$ first establish a second addressing context, providing embedded layers of addressing for proper routing of the incoming data packets from the global GSN 110 to the second serving GSN $125_B$, to the second base station $120_B$ and to the mobile unit $140_A$, and conversely embedded layers of addressing for proper routing for outgoing data packets from the mobile unit $140_A$, via the second base station $120_B$, through the second serving GSN $125_B$ and global GSN 110, and into the packet data network 130. The establishment of this second addressing context for the mobile unit $140_A$ between the global GSN 110 and the second serving GSN $125_B$, coupled with the informing of the second base station $120_B$ of an impending hand-off, create the second communication path 165 illustrated in FIG. 2.

In preparation for the hand-off, the first communication path 160 continues to be utilized for communication with the mobile unit $140_A$. Utilizing the first addressing context, incoming data packets from the packet data network 130 are embedded in addressing layers by the global GSN 110, and these incoming, addressed data packets are routed from the global GSN 110 to the first serving GSN $125_A$, to the first base station $120_A$ and to the mobile unit $140_A$, and conversely, outgoing data packets from the mobile unit $140_A$, via the first base station $120_A$, through the first serving GSN $125_A$ and global GSN 110, are routed into the packet data network 130. In accordance with the present invention, simultaneously or otherwise concurrently with the use of the first addressing context, the second addressing context is also utilized to route the same (duplicate) incoming data packets to the second base station $120_B$. More specifically, simultaneously utilizing the second addressing context, incoming data packets from the packet data network 130 are embedded in addressing layers by the global GSN 110, and these incoming, addressed data packets are routed from the global GSN 110 to the second serving GSN $125_B$, to the second base station $120_B$. As a consequence, upon completion of the hand-off when the mobile unit $140_A$ retunes to or otherwise communicates with the second base station $120_B$, current incoming data packets are immediately available for transmission to the mobile unit $140_A$. Also at that time following retuning, any outgoing voice communications from the mobile unit $140_A$ may be transmitted to the second base station $120_B$, for routing into the packet data network 130 via the second serving GSN $125_B$ and global GSN 110 (with the first base station $120_A$ having completed transmission of any information it previously received from the mobile unit $140_A$). Prior to such retuning of the mobile unit $140_A$, the second base station $120_B$ may simply discard (rather than buffer) incoming data packets designating the mobile unit $140_A$. Such completion of the hand-off is discussed below with respect to FIG. 3.

Figure 3:
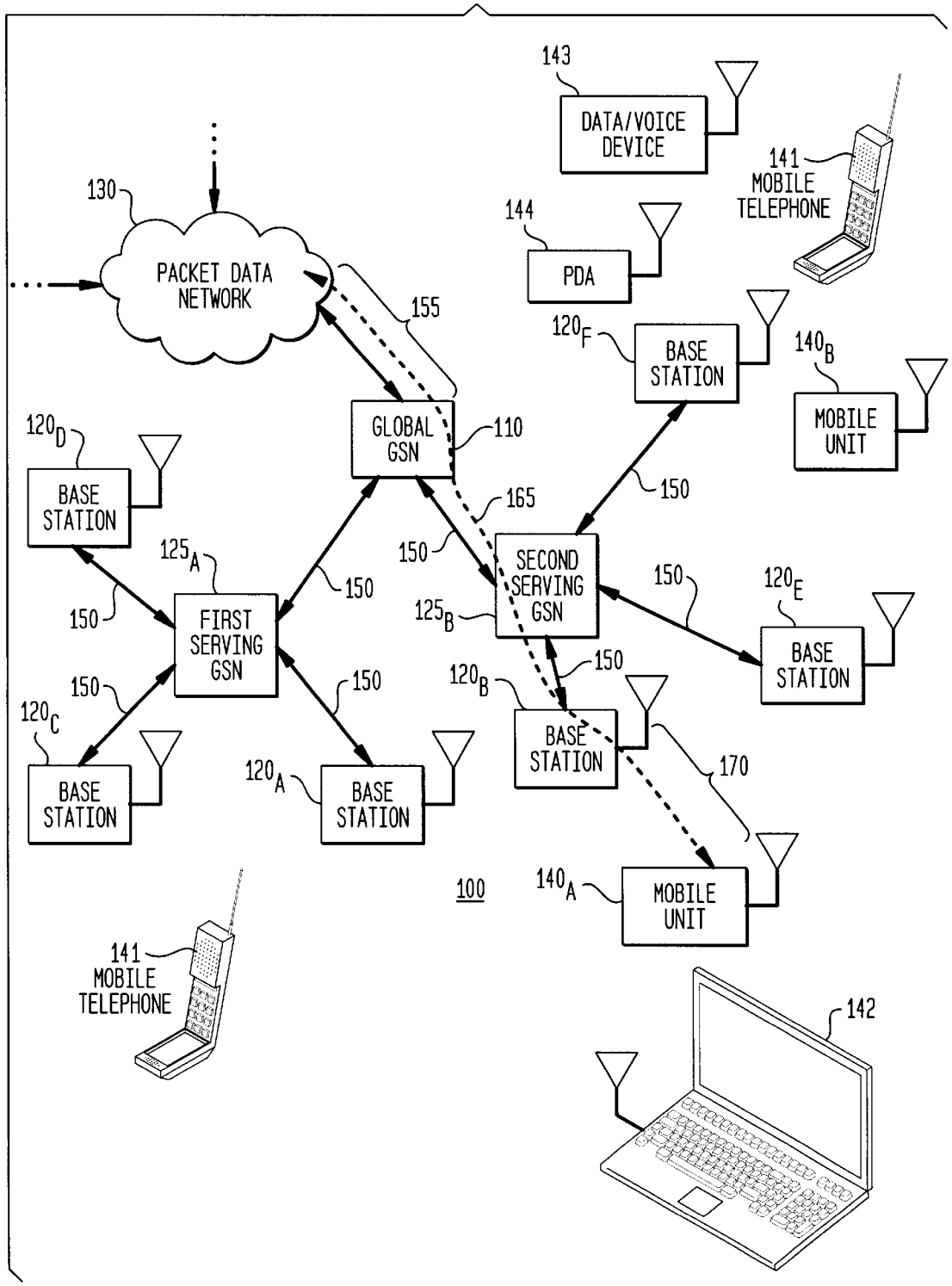
FIG. 3 is a block diagram illustrating a system embodiment during completion of a hand-off, with the second communication path illustrated from the global GSN through the second serving GSN and second base station to the mobile unit, in accordance with the present invention.

FIG. 3 is a block diagram illustrating the system embodiment 100 during completion of a hand-off, with the second communication path 165 illustrated from the global GSN 110 through the second serving GSN $125_B$ and second base station 120 to the mobile unit $140_A$, in accordance with the present invention. When the second communication path 165 has been established, in accordance with the present invention, the mobile unit $140_A$ then subsequently (i.e., at a time t greater than or equal to time $t_1$) tunes to a specified channel of or otherwise sets up a communication path to the second base station $120_B$, illustrated as communication path 170, for continuing the-same voice communication session via the second communication path 165 (i.e., via the second addressing context). Upon such retuning, the mobile unit $140_A$ may immediately receive incoming data packets and transmit outgoing data packets via the second base station $120_B$, the second serving GSN $120_B$ and the global GSN 110. At that time, the use of the first addressing context by the global GSN 110 may cease, and the first base station $120_A$ may discard (rather than retransmit or reroute) any incoming data packets designating the mobile unit $140_A$. The hand-off of the voice communication session over a data network, from the serving base station to the target base station, is then complete, with the voice communication session continuing uninterrupted through data links or paths 155, 165 and 170, as illustrated in FIG. 3.

As mentioned above, the hand-off procedures of the present invention are designed primarily for hand-off of communication sessions occurring in real-time, in which transmission delays or interruptions are highly undesirable, such as voice communications. Other types of hand-offs for packet data networks, such as for text file transmission, may occur utilizing standard, known procedures, in which both incoming and outgoing data communication is ceased in its entirety, any waiting data is buffered, with data communication (and retransmission (or rerouting) of buffered data) resuming following hand-off.

As may be apparent from the above discussion, the hand-off of the voice communication session, from the first, serving base station $120_A$ to the second, target base station $120_A$, utilizing the global GSN 110 configured for simultaneous use of the second addressing context, occurs seamlessly and without significant or perceptible interruption. Indeed, contrary to the GPRS standard, which may have a hand-off interruption as long as five seconds, the only communication interruption in the hand-off of the present invention occurs while the mobile unit 140 retunes to the target, second base station $120_B$, an unavoidable interruption on the order of an imperceptible 90–100 milliseconds. In addition, such a hand-off is accomplished without the need for additional network resources.

Figure 4:
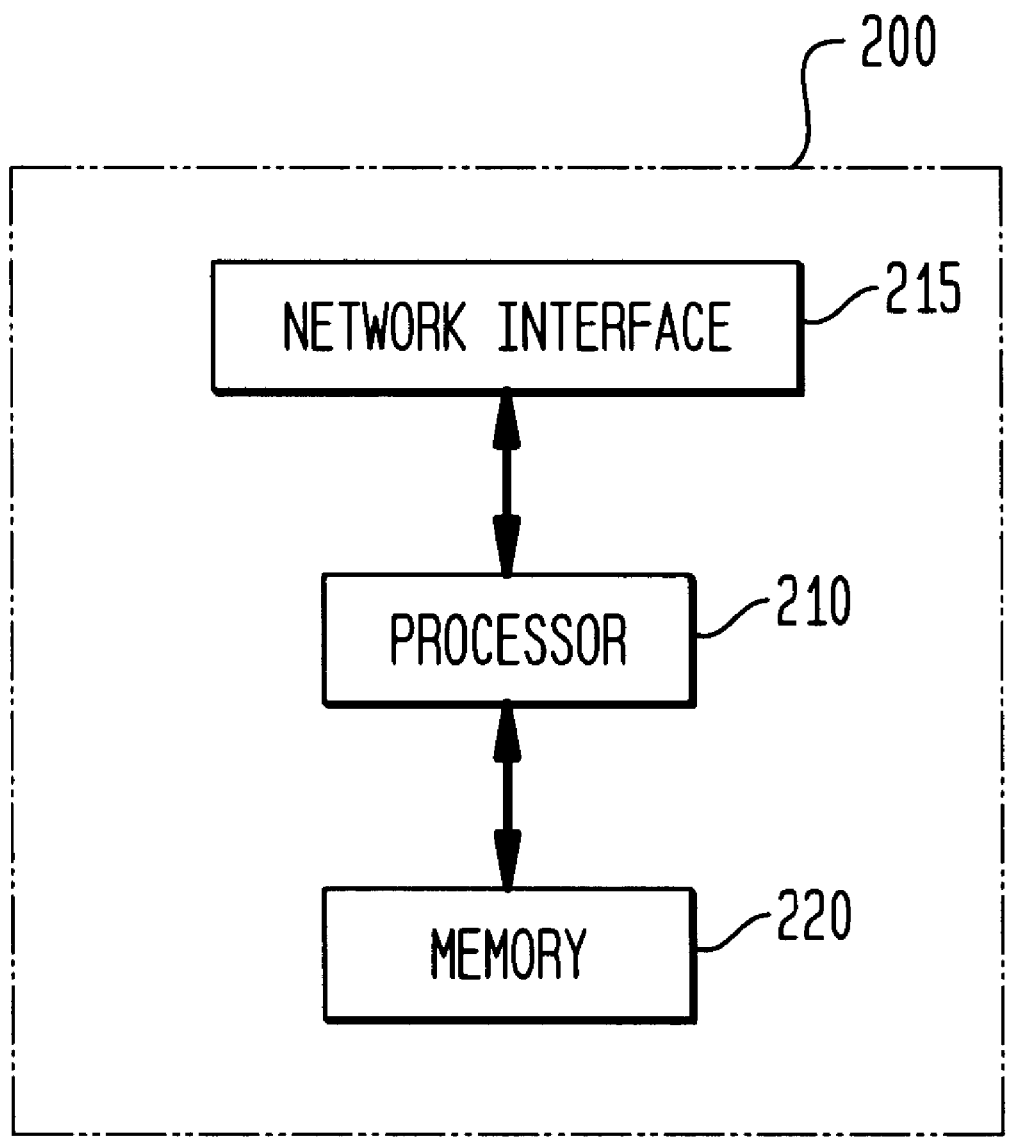
FIG. 4 is a block diagram illustrating an apparatus embodiment in accordance with the present invention.

FIG. 4 is a block diagram illustrating an apparatus embodiment 200 in accordance with the present invention. As discussed in greater detail below, such an apparatus 200 may be included within a global GSN 110 or another component of the system 100. The apparatus 200 includes a processor 210, a network interface 215, and a memory 220. The network interface 215 is utilized to address (utilizing the first addressing context and the second addressing context) and to route incoming and outgoing data packets, when the apparatus 200 is embodied within a global GSN 110. The network interface 215 is also utilized for transmission and reception of the various messages mentioned above, such as the hand-off requests routed from the first base station $120_A$ and first serving GSN $125_A$ to the second serving GSN $125_B$ and second base station $120_B$. The memory 220 may be a magnetic hard drive, an optical storage device, or any other type of data storage apparatus. The memory 220 is used to store information pertaining to addressing contexts, routing information, and program instructions, as discussed in greater detail below.

Continuing to refer to FIG. 4, the processor 210 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or $E^2$PROM.

The methodology of the invention, as discussed above with reference to FIGS. 1–3 and as discussed below with reference to FIG. 5, may be programmed and stored, in the processor 210 with its associated memory (such as memory 220) and other equivalent components, as a set of program instructions for subsequent execution when the processor 210 is operative (i.e., powered on and functioning).

Figure 5:
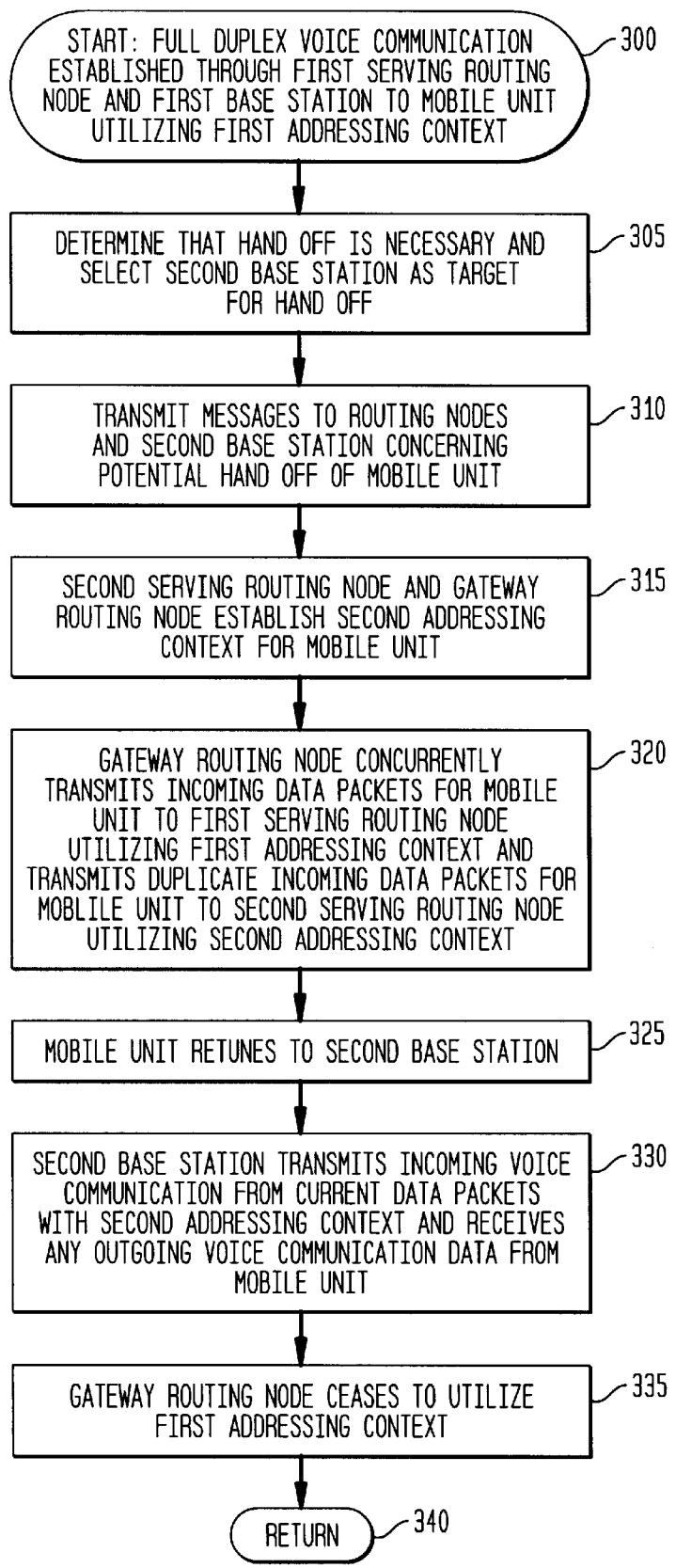
FIG. 5 is a flow diagram illustrating a method embodiment in accordance with the present invention.

FIG. 5 is a flow diagram illustrating a method embodiment in accordance with the present invention. Prior to the beginning of a hand-off, a full duplex voice communication session has been established with the mobile unit $140_A$ through the gateway routing node (global GSN 110), the first serving routing node (first serving GSN $125_A$) and first base station $120_A$. Beginning with start step 300, the method determines that a hand-off is necessary or preferable, step 305. This may be accomplished through various methods known in the art, from various requests transmitted by the serving base station, such as base station $120_A$, with responses from the potential target base stations, such as base station $120_B$, or by determinations made by the particular mobile unit 140. Next, as part of step 305, a target base station is selected for a hand-off, also as known in the art, such as second base station $120_B$.

Next, in step 310, various hand-off messages are transmitted within the system 100, informing the gateway routing node, the serving routing nodes, and the serving (first) and target (second) base stations of the potential hand-off of the mobile unit, depending upon how the target base station has been selected. For example, the target base station may be informed of the hand-off directly by the mobile unit, in which case messaging is transmitted among the other system 100 components. Also for example, the serving base station may be informed of the hand-off by the mobile unit 140 or may itself perform that determination, in which case messaging is then transmitted to the other system 100 components. As mentioned above, this messaging may occur in a variety of ways, such as one or more messages between and among the first base station $120_A$, the first serving GSN $125_A$, the global GSN 110, the second serving GSN $125_B$, and the second base station $120_B$.

The gateway routing node and the second serving routing node, such as the global GSN 110 and the second serving GSN $125_B$, then establish a second addressing context (tunnel), step 315, such that incoming data packets from the packet data network 130 will be embedded in addressing layers by the global GSN 110, and these incoming, addressed data packets may then be routed from the global GSN 110 to the second serving GSN $125_B$, to the second base station $120_B$. Next, in step 320, the gateway routing node (such as global GSN 110) concurrently transmits incoming data packets for the mobile unit (from the data network 130) to the first serving routing node (such as first serving GSN $125_A$) utilizing the first addressing context (for transmission to the first base station $120_A$), and to the second serving routing node (such as second serving GSN $125_B$) utilizing the second addressing context (for transmission to the second base station $120_B$).

Following this establishment of the second communication link 165, the mobile unit is then directed to retune (or initiates its own retuning) to an available channel of or otherwise communicate with the second base station $120_B$, step 325, establishing communication link 170 illustrated in FIG. 3, for continuing the same voice communication session through the second communication link 165. When the mobile unit has established such communication with the second base station $120_B$, the second base station $120_B$ then transmits (to the mobile unit) incoming voice communication from the current data packets having the second addressing context, and receives any outgoing voice communication (from the mobile unit) for transmission as data packets to the gateway routing node (and on into the data network 130, as needed), step 330. Following step 330, the hand-off is complete, and the gateway routing node (such as the global GSN 110) may cease to use the first addressing context (and thereby cease transmitting duplicate incoming data packets to the first base station 120$_A$ through the first serving GSN 125$_A$), step 335. Following step 335, the method may end, return step 340.

It should be noted that if another hand-off is advisable between this base station (now a serving base station) and a third base station (now a target base station), the procedures outlined above may be repeated. This process may be continued for as many hand-offs as may be necessary for the given communication session of the mobile unit.

Numerous advantages of the present invention may be apparent from the above discussion. First, as illustrated above, the wireless communication system of the present invention provides virtually seamless and imperceptible hand-offs of voice communication sessions of mobile units within a packet data network environment. Second, the various embodiments of the present invention are reasonably efficient and capable of cost-effective implementation in existing communication equipment such as switches and base stations. Moreover, the various embodiments of the present invention eliminate or minimize the use of additional network resources, while being compatible with other intelligent network devices and systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A method for a hand-off of a communication session in a wireless data network system, in which the communication session has been established previously with a mobile unit through a first base station, a first serving routing node and a gateway routing node utilizing a first addressing context, the method comprising:

(a) when a second base station has been selected for hand-off, establishing a second addressing context for the mobile unit, between the gateway routing node and a second serving routing node;

(b) concurrently routing incoming data packets for the mobile unit to the first serving routing node utilizing the first addressing context and to the second serving routing node utilizing the second addressing context; and (c) when the mobile unit has retuned to the second base station, transmitting current voice communication from the second base station from the incoming data packets with the second addressing context and receiving outgoing voice communication from the mobile unit.

2. The method of claim 1, further comprising:

(d) ceasing to route incoming data packets for the mobile unit to the first serving routing node utilizing the first addressing context while continuing to route incoming data packets for the mobile unit to the second serving routing node utilizing the second addressing context.

3. The method of claim 1, wherein prior to retuning of the mobile unit, at the second base station, discarding incoming data packets having the second addressing context designating the mobile unit.

4. The method of claim 1, wherein subsequent to retuning of the mobile unit, at the first base station, discarding incoming data packets with the first addressing context designating the mobile unit.

5. The method of claim 1, wherein step (a) further comprises transmitting a message between the second base station and the second serving routing node concerning the hand-off of the mobile unit.

6. The method of claim 1, wherein step (a) further comprises: transmitting a hand-off message from the first base station to the first serving routing node, and via the gateway routing node, to the second serving routing node, the hand-off message designating the second base station.

7. The method of claim 6, wherein the hand-off message further designates the communication session as a voice communication session.

8. The method of claim 1, wherein step (a) further comprises:

transmitting a hand-off message from the first serving routing node to the second serving routing node, the hand-off message designating the second base station and further designating the communication session as a voice communication session.

9. The method of claim 1, wherein the first addressing context comprises embedded addressing layers designating the mobile unit, the first base station and the first serving routing node.

10. The method of claim 1, wherein the second addressing context comprises embedded addressing layers designating the mobile unit, the second base station and the second serving routing node.

11. The method of claim 1, wherein the gateway routing node is a global generalized packet radio service (GPRS) support node and the first and second serving routing nodes are serving GPRS support nodes.

12. A system for a hand-off of a communication session in a data network, in which the communication session has been established previously with a mobile unit through a first base station, a first serving routing node and a gateway routing node utilizing a first addressing context, the system comprising:

a plurality of base stations, the plurality of base stations including the first base station and a second base station, wherein when the mobile unit retunes to the second base station, the second base station includes instructions to transmit to the mobile unit current voice communication from the incoming data packets with a second addressing context and to receive outgoing voice communication from the mobile unit;

a plurality of serving routing nodes, the plurality of serving routing nodes including the first serving routing node and a second serving routing node, the first serving routing node coupled to the first base station and the second serving routing node coupled to the second base station; and a gateway routing node coupled to the first serving routing node and to the second serving routing node, the gateway routing node further coupled to the data network, wherein the gateway routing node includes instructions, when the second base station has been selected for the hand-off, to establish the second addressing context for the mobile unit, between the gateway routing node and the second serving routing node; and to concurrently route incoming data packets for the mobile unit to the first serving routing node utilizing the first addressing context and to the second serving routing node utilizing the second addressing context.

13. The system of claim 12, wherein the gateway routing node includes further instructions to, subsequent to retuning of the mobile unit to the second base station, cease to route incoming data packets for the mobile unit to the first serving routing node utilizing the first addressing context while continuing to route incoming data packets for the mobile unit to the second serving routing node utilizing the second addressing context.

14. The system of claim 12, wherein prior to retuning of the mobile unit to the second base station, the second base station includes further instructions to discard incoming data packets having the second addressing context designating the mobile unit.

15. The system of claim 12, wherein subsequent to retuning of the mobile unit to the second base station, the first base station includes instructions to discard incoming data packets with the first addressing context designating the mobile unit.

16. The system of claim 12, wherein when the second base station has been selected for hand-off, the second base station includes instruction to transmit a message to the second serving routing node concerning the hand-off of the mobile unit.

17. The system of claim 12, wherein when the second base station has been selected for hand-off, the second serving routing node includes instruction to transmit a message to the second base station concerning the hand-off of the mobile unit.

18. The system of claim 12, wherein when the second base station has been selected for hand-off, the first base station includes instructions to transmit a hand-off message, via the first serving routing node, to the gateway routing node and to the second serving routing node, the hand-off message designating the second base station.

19. The system of claim 18, wherein the hand-off message further designates the communication session as a voice communication session.

20. The system of claim 12, wherein when the second base station has been selected for hand-off, the first serving routing node includes instructions to transmit a hand-off message to the second serving routing node, the hand-off message designating the second base station and further designating the communication session as a voice communication session.

21. The system of claim 12, wherein the first addressing context comprises embedded addressing layers designating the mobile unit, the first base station and the first serving routing node.

22. The system of claim 12, wherein the second addressing context comprises embedded addressing layers designating the mobile unit, the second base station and the second serving routing node.

23. The system of claim 12, wherein the gateway routing node is a global generalized packet radio service (GPRS) support node and the first and second serving routing nodes are serving GPRS support nodes.

24. An apparatus for a hand-off of a communication session in a data network, in which the communication session has been established previously with a mobile unit through a first base station, a first serving routing node and a gateway routing node utilizing a first addressing context, the apparatus comprising:
a network interface for communication with the first serving routing node and a second serving routing node;
a memory storing instructions; and
a processor coupled to the memory and to the network interface, wherein the processor includes instructions, when a second base station has been selected for the hand-off, to establish a second addressing context for the mobile unit, between the gateway routing node and a second serving routing node; and to concurrently route incoming data packets for the mobile unit to the first serving routing node utilizing the first addressing context and to the second serving routing node utilizing the second addressing context.

25. The apparatus of claim 24, wherein the processor includes further instructions to, subsequent to retuning of the mobile unit to the second base station, cease to route incoming data packets for the mobile unit to the first serving routing node utilizing the first addressing context while continuing to route incoming data packets for the mobile unit to the second serving routing node utilizing the second addressing context.

26. The apparatus of claim 24, wherein the first addressing context comprises embedded addressing layers designating the mobile unit, the first base station and the first serving routing node.

27. The apparatus of claim 24, wherein the second addressing context comprises embedded addressing layers designating the mobile unit, the second base station and the second serving routing node.

28. The apparatus of claim 24, wherein the apparatus is embodied within the gateway routing node.

29. A system for a hand-off of a communication session in a data network, in which the communication session has been established previously with a mobile unit through a first base station, a first serving routing node and a gateway routing node utilizing a first addressing context, the system comprising:
means, when a second base station has been selected for hand-off, for establishing a second addressing context for the mobile unit, between the gateway routing node and a second serving routing node;
means for concurrently routing incoming data packets for the mobile unit to the first serving routing node utilizing the first addressing context and to the second serving routing node utilizing the second addressing context; and
means, when the mobile unit has retuned to the second base station, for transmitting current voice communication from the second base station from the incoming data packets with the second addressing context and receiving outgoing voice communication from the mobile unit.

30. The system of claim 29, further comprising:
means, when the mobile unit has retuned to the second base station, for ceasing to route incoming data packets for the mobile unit to the first serving routing node utilizing the first addressing context while continuing to route incoming data packets for the mobile unit to the second serving routing node utilizing the second addressing context.

31. The system of claim 29, further comprising:
means, prior to retuning of the mobile unit, for discarding at the second base station incoming data packets having the second addressing context designating the mobile unit.

32. The system of claim 29, further comprising:
means, subsequent to retuning of the mobile unit, for discarding at the first base station incoming data packets with the first addressing context designating the mobile unit.

33. The system of claim 29, further comprising:
means for transmitting a message between the second base station and the second serving routing node concerning the hand-off of the mobile unit.

34. The system of claim 29, further comprising:
means for transmitting a hand-off message from the first base station to the first serving routing node, and via the gateway routing node, to the second serving routing node, the hand-off message designating the second base station.

35. The system of claim 34, wherein the hand-off message further designates the communication session as a voice communication session.

36. The system of claim 29, further comprising:
means for transmitting a hand-off message from the first serving routing node to the second serving routing node, the hand-off message designating the second base station and further designating the communication session as a voice communication session.

37. The system of claim 29, wherein the first addressing context comprises embedded addressing layers designating the mobile unit, the first base station and the first serving routing node.

38. The system of claim 29, wherein the second addressing context comprises embedded addressing layers designating the mobile unit, the second base station and the second serving routing node.

* * * * *